US009736621B2

(12) United States Patent
Ekberg et al.

(10) Patent No.: US 9,736,621 B2
(45) Date of Patent: Aug. 15, 2017

(54) LOCAL COMMUNICATION INTERCEPTION

(71) Applicant: NOKIA CORPORATION, Espoo (FI)

(72) Inventors: Jan-Erik Ekberg, Vantaa (FI); Mikko Uusitalo, Helsinki (FI); Zexian Li, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/905,475

(22) PCT Filed: Jul. 31, 2013

(86) PCT No.: PCT/FI2013/050780
§ 371 (c)(1),
(2) Date: Jan. 15, 2016

(87) PCT Pub. No.: WO2015/015045
PCT Pub. Date: Feb. 5, 2015

(65) Prior Publication Data
US 2016/0157044 A1 Jun. 2, 2016

(51) Int. Cl.
H04W 4/00 (2009.01)
H04L 29/06 (2006.01)
(Continued)

(52) U.S. Cl.
CPC ........... *H04W 4/005* (2013.01); *H04L 63/123* (2013.01); *H04L 63/306* (2013.01);
(Continued)

(58) Field of Classification Search
CPC ................ H04L 63/123; H04L 63/306; H04M 2203/301; H04M 2207/185; H04M 3/2281; H04W 12/02; H04W 4/005
See application file for complete search history.

(56) References Cited

U.S. PATENT DOCUMENTS

2006/0168210 A1 7/2006 Ahonen et al.
2011/0153809 A1 6/2011 Ghanem et al.
(Continued)

FOREIGN PATENT DOCUMENTS

SE  WO 2015113996 A2 * 8/2015 ............ H04W 12/02
WO  2008040583 A1 4/2008
(Continued)

OTHER PUBLICATIONS

International Search Report and Written Opinion received for corresponding Patent Cooperation Treaty Application No. PCT/FI2013/050780, dated Feb. 12, 2014, 22 pages.
(Continued)

*Primary Examiner* — Kashif Siddiqui
(74) *Attorney, Agent, or Firm* — Mintz Levin Cohn Ferris Glovsky and Popeo, P.C.

(57) ABSTRACT

In accordance with an example embodiment of the present invention, there is provided an apparatus, comprising communication circuitry configured to receive a message, and execution circuitry configured to, in response to the message comprising an instruction to intercept a direct device-to-device (D2D) communication, render the apparatus capable of storing at least in part the direct device-to-device communication in at least one of the apparatus and a memory. The intercepting may comprise lawful interception.

20 Claims, 4 Drawing Sheets

(51) Int. Cl.
*H04W 12/02* (2009.01)
*H04M 3/22* (2006.01)

(52) U.S. Cl.
CPC ......... *H04M 3/2281* (2013.01); *H04W 12/02* (2013.01); *H04M 2203/301* (2013.01); *H04M 2207/185* (2013.01)

(56) References Cited

U.S. PATENT DOCUMENTS

| | | |
|---|---|---|
| 2011/0154181 A1 | 6/2011 | Kawa et al. |
| 2012/0072979 A1* | 3/2012 | Cha .......... G06F 21/34 726/7 |
| 2012/0076303 A1 | 3/2012 | O'Leary |
| 2013/0034082 A1 | 2/2013 | Etemad et al. |
| 2014/0314010 A1* | 10/2014 | Yang .......... H04W 76/023 370/329 |
| 2015/0009881 A1* | 1/2015 | Yeh .......... H04W 4/08 370/312 |

FOREIGN PATENT DOCUMENTS

| | | |
|---|---|---|
| WO | 2009039114 A1 | 3/2009 |
| WO | 2011100331 A1 | 8/2011 |
| WO | WO-2013083074 A1 | 6/2013 |

OTHER PUBLICATIONS

Institute for Information Industry (III), "Proximity aware service consideration of lawful interception," 3GPP TSG-SA WG1 Meeting #57, Kyoto, Japan, Feb. 13-17, 2012.

* cited by examiner

LOCAL COMMUNICATION INTERCEPTION

RELATED APPLICATION

This application was originally filed as Patent Cooperation Treaty Application No. PCT/FI2013/050780 filed Jul. 31, 2013.

TECHNICAL FIELD

The present application relates generally to local or device-to-device, D2D, communication.

BACKGROUND

Wireless communication, such as radio communication, may be arranged to occur between mobile units, such as cellular telephones, wireless-enabled laptops or wireless sensors or other radio-enabled mobile devices, and base stations. A telephone call, for example, may be placed from a smartphone, from where it may be routed via an air interface to a base station. From the base station, the call may be routed through a cellular core network to a call recipient. Alternatively, a smartphone may be arranged to access the Internet, for example, via the air interface to the base station, and from the base station directly to a data communication network whereby a core network is in this case not needed to access the Internet.

Mobile radio-enabled devices, such as suitably enabled cellular telephones, may be capable of communicating with each other directly or locally. Such communication may be known as device-to-device, or D2D, communication.

Direct D2D communication may comprise that a first mobile transmits information encoded in a radio signal, and a second mobile receives the radio signal, wherein the radio signal isn't re-transmitted along the way. In other words, radio energy encoded with information transmitted from the first mobile is received in the second mobile.

Local D2D communication may comprise that a first mobile transmits information encoded in a radio signal, a base station receives the information encoded in the radio signal, and the base station re-transmits the information encoded in a second radio signal, to be received by a second mobile. In local D2D communication, the base station is configured to re-transmit the information to the second mobile without forwarding it to further nodes comprised in a radio-access network or core network.

Communication secrecy is often regulated legally and the right to communication privacy safeguarded. However, in some jurisdictions and subject to judicial oversight, law enforcement officials may have at least partial access to content of communications, such as for example telephone calls and data use. Access to content of communications may be known as lawful interception.

Lawful interception may be implemented in a core network of a cellular communication network, where a node comprised in the core network may be configured to, responsive to operator input, produce copies of communications with a specified terminal as endpoint for use by law enforcement.

SUMMARY

Various aspects of examples of the invention are set out in the claims.

According to a first aspect of the present invention, there is provided an apparatus, comprising communication circuitry configured to receive a message, and execution circuitry configured to, in response to the message comprising an instruction to intercept a direct device-to-device communication, render the apparatus capable of storing at least in part the direct device-to-device communication in at least one of the apparatus and a memory.

According to a second aspect of the present invention, there is provided a method, comprising receiving a message, and in response to the message comprising an instruction to intercept a direct device-to-device communication, rendering an apparatus capable of storing at least in part the direct device-to-device communication in at least one of the apparatus and a memory.

According to a third aspect of the present invention, there is provided an apparatus, comprising at least one processor, and at least one memory including computer program code the at least one memory and the computer program code configured to, with the at least one processor, cause the apparatus to at least transmit toward a user equipment a message, the message comprising an instruction for the user equipment to begin intercepting contents of a direct device-to-device communication, and to receive from the user equipment at least part of the contents of the direct device-to-device communication.

According to a fourth aspect of the present invention, there is provided a method, comprising transmitting toward a user equipment a message, the message comprising an instruction for the user equipment to begin intercepting contents of a direct device-to-device communication, and receiving from the user equipment at least part of the contents of the direct device-to-device communication.

According to further aspects of the present invention, computer programs are provided that are configured to cause methods in accordance with the second and fourth aspect to be performed.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Lawful interception, and more generally communications interception, presents a challenge in D2D communication that doesn't traverse a core network where interception is usually implemented. According to at least some embodiments of the invention, interception of communications is performed in a mobile terminal, for example in a trusted execution environment (TEE) distinct from a main operating system of the mobile terminal. The interception may be surreptitiously configured via encrypted signaling from the network.

Figure 1:
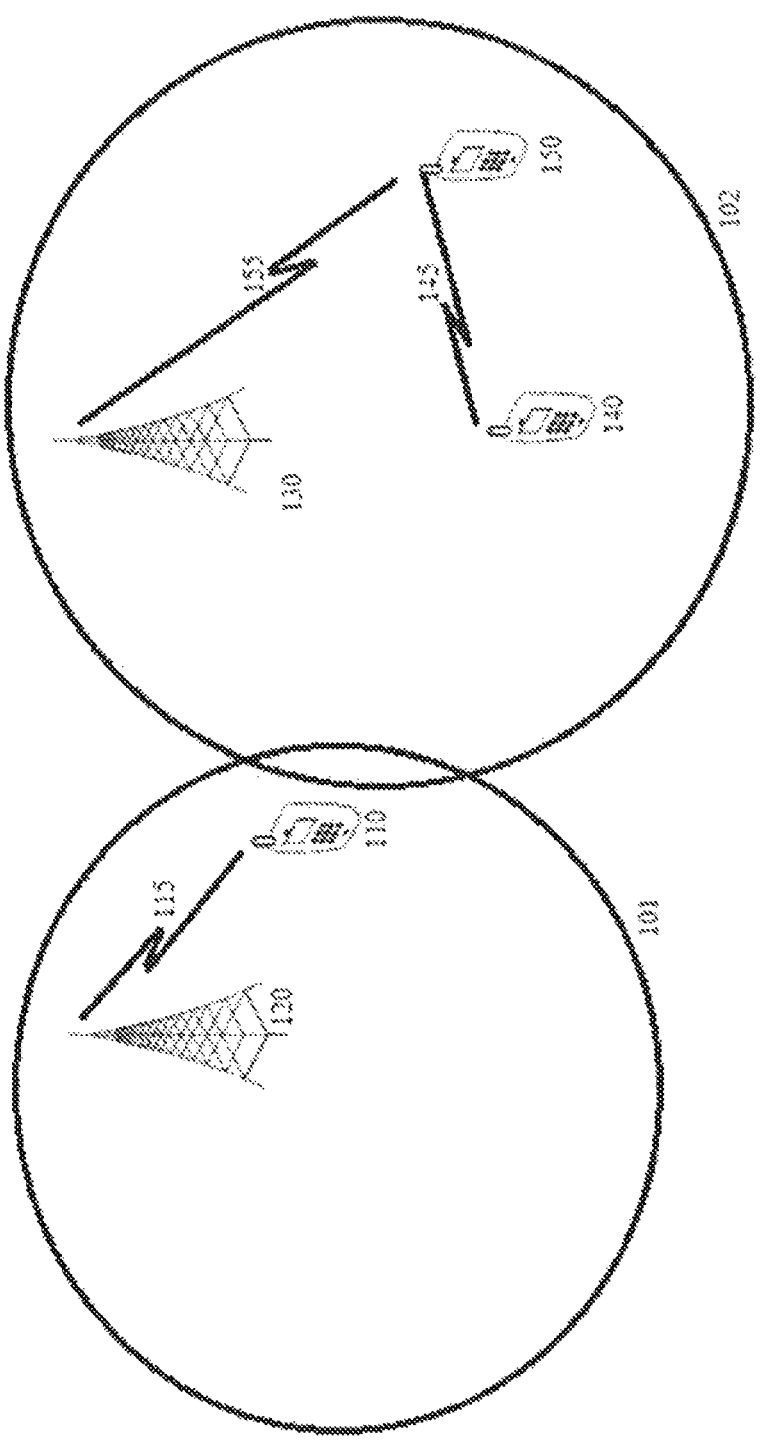
FIG. 1 illustrates an example system capable of supporting at least some embodiments of the invention.

FIG. 1 illustrates an example system capable of supporting at least some embodiments of the invention. Illustrated is mobile 110, which may comprise, for example, a user equipment, cellular telephone, laptop computer, tablet computer, personal digital assistant (PDA), wireless sensor or other mobile device with connectivity functions. An example of structure of a mobile is presented in FIG. 3. Mobile 110 is illustrated as being disposed in the cell coverage area of cell 101. Cell 101 is controlled by base station 120, which may be configured to operate in accordance with a radio access technology. Examples of radio access technologies include wireless local access network (WLAN), wideband code division multiple access (WCDMA) and long term evolution (LTE). Mobile 110 is illustrated as being in radio communication with base station 120 via wireless link 115. When base station 120 operates according to a certain radio access technology (RAT), wireless link 115 operates according to the same RAT. Wireless link 115 may comprise an uplink for conveying information from mobile 110 to base station 120. Wireless link 115 may comprise a downlink for conveying information from base station 120 to mobile 110. Mobile 110 is in the example of FIG. 1 attached to a cell of base station 120, namely cell 101. Being attached to a cell may comprise that mobile 110 has a state, such as active or idle, with respect to the cell. Being attached may comprise having an active bearer with the cell. Being attached to a cell may comprise that the cell is the cell mobile 110 will signal to in case mobile 110 needs connectivity.

Mobile 110 may access services of a cellular communications network via wireless link 115 and base station 120. For example, base station 120 may be operably connected to further nodes, which are not illustrated in FIG. 1. Such further nodes may comprise, for example, radio access network controllers or core network nodes, such as switches or gateways. Mobile 110 may request, and receive, content from the Internet via such further nodes, base station 120, and wireless link 115.

Illustrated in FIG. 1 are also mobiles 140 and 150. Mobile 140 and mobile 150 are illustrated as being interconnected by D2D wireless link 145. D2D wireless link 145 may operate in accordance with a cellular RAT, or another RAT suitable for such use. D2D wireless link 145 may operate on a different frequency band than cellular cells, such as for example an unlicensed band or a dedicated D2D band. Alternatively, D2D wireless link 145 may operate on a same frequency band as cellular cells such as cell 101 and/or cell 102. Mobile 150 is illustrated as being in radio communication with base station 130 via wireless link 155. Wireless link 155 may be essentially similar to wireless link 115. Base station 130 controls cell 102, which is adjacent to cell 101. Cell coverage areas of cell 101 and cell 102 overlap to a degree to allow for seamless service provision to mobiles roaming in the area. Should a mobile cross over from the cell coverage area of cell 101 to that of cell 102, a handover procedure may be triggered to cause attachment of the mobile to change from cell 101 to cell 102. In FIG. 1, mobile 110 is near the overlap area of cell coverage areas of cell 101 and cell 102.

D2D wireless link 145 is a direct D2D link, since a communication path routed over it between mobile 140 and mobile 150 doesn't traverse any other nodes, in particular it doesn't traverse a base station node such as base station 130.

In terms of intercepting communications between mobiles in FIG. 1, in case mobile 150 has a communication session, such as for example a telephone call, with mobile 110 the contents of the communication session may be intercepted and copied in the cellular network. The communication session between mobile 150 and mobile 110 may traverse wireless link 155, base station 130, base station 120 and wireless link 115. An interception functionality in base station 130, base station 120 or a node interconnecting the base stations can produce a copy of at least part of contents of the communication session, for example as a response to operator input. Intercepting may be needed to comply with legal requirements or to verify that an automatically communicating network is functioning as designed. An example of an automatically communicating network is a sensor network.

In general, intercepting may comprise that at least part of contents of a communication is surreptitiously copied and provided to a third party that is not a party to the communication being intercepted.

Intercepting a communication session between mobiles 140 and 150 that is performed over D2D wireless link 145 on the other hand is not possible for a node comprised in the communications network, since contents of the communication session are delivered directly from mobile to mobile instead of being routed via network nodes. Where information about the contents of a communication session performed over D2D link 145 is needed, for legal or technical reasons, at least one of mobile 140 and mobile 150 may be instructed to perform interception. In the example of FIG. 1, mobile 150 may receive a message via wireless link 155, the message comprising an instruction to at least in part intercept contents of a D2D communication session. The intercepting may comprise that mobile 150 forwards a copy of at least part of the contents of the communication session in real time to base station 130 via wireless link 155, that mobile 150 stores a copy of at least part of the contents of the communication session and forwards it to base station 130 in non-real time, or that mobile 150 stores a copy of at least part of the contents of the communication session and provides the copy, at least in part, to a network node after the communication session has ended.

The intercepting may be performed in mobile 150 without informing at least one of a user of mobile 150 and an operating system of mobile 150. Mobile 150 may be configured to provide an indication of the intercepting to mobile 140 via D2D wireless link 145, responsive to which mobile 140 may also begin intercepting at least part of the content of the communication session. An indication provided by mobile 150 may be delivered to mobile 140 without informing a user of either mobile 140 or mobile 150.

A D2D session establishment procedure may comprise receiving from a base station a message, which may comprise an instruction to intercept contents of the D2D session. The message maybe composed in a base station or in other network nodes. The message may be encrypted so that only an entity comprised in a mobile that is furnished with capability to decrypt the message can discern, whether interception is requested for the D2D session. For example, the message may be provided to a trusted execution environment (TEE), in a mobile wherein the TEE is capable of decrypting the message. The TEE may be distinct from a main processor of the mobile, and the main processor may be configured to wait for a signal from the TEE before starting the D2D session. In some embodiments, the message comprises a nonce that the TEE will provide a response to in the signal to the main processor. In generating the response to the nonce, the TEE may employ secret information accessible to it. Such secret information may be stored in the TEE, or stored elsewhere in mobile 150 and accessible to the TEE. For example, the secret information may be stored in a subscriber information module (SIM), card. The network may have a copy of the secret information to enable the network to verify the response is correct. The main processor may forward the response to the nonce to a base station. This way, the main processor is prevented from bypassing the TEE in establishing the D2D session in case the D2D session can only be established with permission from a base station. In case the message doesn't comprise an instruction to intercept contents of the D2D session, the message may be effectively a dummy message. The dummy message may still comprise the nonce which may be handled identically to the case where the instruction to intercept is present, to conceal possible interception. In other words, the message as such may be a compulsory element of D2D session establishment, and from the point of view of the main processor, the message may be handled identically irrespective of whether or not it comprises an instruction to intercept.

In some embodiments, a main processor may perform the actions discussed herein as occurring in a TEE. This may occur, for example, if a mobile doesn't have a TEE or where a TEE isn't configured to participate in interception.

The mobile receiving the message may verify the message originates from a source authorized to issue instructions concerning interception. This verifying may comprise verifying a digital signature of the message using a signature verification key securely stored in the mobile, for example in a TEE. The TEE may perform the verifying, or alternatively the main processor may perform the verifying before providing the message to the TEE.

During a D2D session that is intercepted, the contents of the D2D session may be routed via the TEE to enable the TEE to at least in part copy the contents. The routing of the content via the TEE may occur regardless of whether actual intercepting takes place, to conceal any interception from a user of the terminal and/or the main operating system of the mobile. In case encryption is used in the D2D session and a main processor of the mobile performs the encryption and decryption, the routing of the content via the TEE may involve routing of a decrypted version of the content.

When the mobile provides, as part of intercepting, a copy containing at least part of the contents of the D2D session to a base station it may provide it in encrypted form. To enable this, the mobile, for example a TEE comprised in the mobile, may be in possession of an encryption key to use before providing the copy of the content toward a base station. The encryption key may be statically stored in the mobile, or the encryption key may be provided in the message comprising an instruction to perform the intercepting. In the latter case, the message may be arranged to be of the same length regardless of whether it comprises the instruction to intercept and the key, or not. Providing the contents in encrypted form may be desirable in case the contents involve private information, such as for example contents of a telephone discussion.

A TEE may be configured to process the contents of the D2D session before transmitting it to a base station. For example, if the D2D session is a telephone call, the TEE may be configured to perform speech recognition on the contents and provide a transcript of the telephone call instead of audio data of the call. This may reduce the amount of data to be provided as content, which may reduce battery consumption when transmitting and may also reduce the likelihood that a user of the mobile notices the transmission. Another example of processing is where the contents are compressed by using a compression algorithm. A yet further example is where only part of the contents are copied in the interception. For example, if the D2D session is a video call, the message comprising the instruction to intercept may specify that the interception is only to apply to audio, not video. In general where the D2D session comprises multiple media elements, the message may specify which media elements are to be subject to interception.

In general there is provided an apparatus, such as for example a mobile, a control device for inclusion in a mobile, to control the functioning thereof, or a trusted execution apparatus. A trusted execution apparatus may host a trusted execution environment. The apparatus may comprise memory access circuitry configured to retrieve a verification key from a memory. The memory access circuitry may comprise a hardware interface to a memory, such as for example at least part of a memory access bus. The memory may be comprised in the apparatus, or the memory may be external to the apparatus. The apparatus may comprise communication circuitry configured to receive a message. The communication circuitry may comprise, for example, an input or device of the apparatus. Where the apparatus comprises a mobile, the input device may comprise a radio receiver. Where the apparatus comprises a control device or trusted execution apparatus, the input device may comprise an input or output port of the control device or trusted execution apparatus. An input or output port may comprise a serial or parallel communication port, for example. In some embodiments, the communications circuitry performs memory access functions and the apparatus doesn't comprise separate memory access circuitry.

The apparatus may further comprise execution circuitry which may be configured to determine, using the verification key, whether the message is authentic. The determination may comprise verifying a digital signature of the message with the verification key. The execution circuitry may comprise, for example, at least one processing core. The execution circuitry may be configured according to von Neumann, Harvard or modified Harvard architecture, for example. In response to the message being determined to be authentic and to comprise an instruction to intercept a direct D2D communication, the execution circuitry is further configured to render the apparatus capable of storing, or causing storing, at least in part content of the direct D2D communication in at least one of the apparatus and the memory. In some embodiments, the apparatus does not determine whether the message is authentic, in other words the verifying of the digital signature is absent in some embodiments. In some embodiments, instead of content, or in addition to content, metadata relating to the D2D communication is stored. Metadata may comprise, for example, information identifying participants of the D2D communication and/or a duration of the D2D communication.

In some embodiments, in response to the message being determined to be authentic and to not comprise an instruction to intercept the direct device-to-device communication, the execution circuitry is further configured to cause the communication circuitry to indicate acceptance of the direct device-to-device communication. The acceptance may be indicated to a main processor of a mobile, for example. The indication of acceptance may comprise a response to a nonce comprised in the message. In some embodiments, the indication of acceptance and response to the nonce are caused to be transmitted in separate messages. In some embodiments, the nonce and response to the nonce are absent.

In some embodiments, the message comprises an encryption key, and the execution circuitry is configured to encrypt the stored at least part of the D2D communication and cause it to be provided in encrypted form toward a node. Alternatively, the apparatus may be pre-configured with an encryption key that the apparatus may use to encrypt the at least part of the D2D communication before causing it to be provided in encrypted form toward a node.

In some embodiments, the apparatus is comprised in a trusted execution environment. The trusted execution environment may be comprised in a trusted execution apparatus. The trusted execution apparatus may comprise a trusted platform module cryptoprocessor, for example. An example of a trusted platform module cryptoprocessor is a secure smart card.

In some embodiments, the apparatus is comprised in a radio controller integrated chip. In these embodiments, the apparatus may have access to contents of the D2D communication on a low layer independently of a main processor of a mobile. In some embodiments, where the apparatus comprises a mobile, the mobile comprises a main processor and, separately, a trusted execution apparatus. In these embodiments, the trusted execution apparatus may be configured to indicate acceptance of the message such that the indication of acceptance is transmitted from the trusted execution apparatus to the main processor internally via electrical leads comprised in the mobile.

Figure 2:
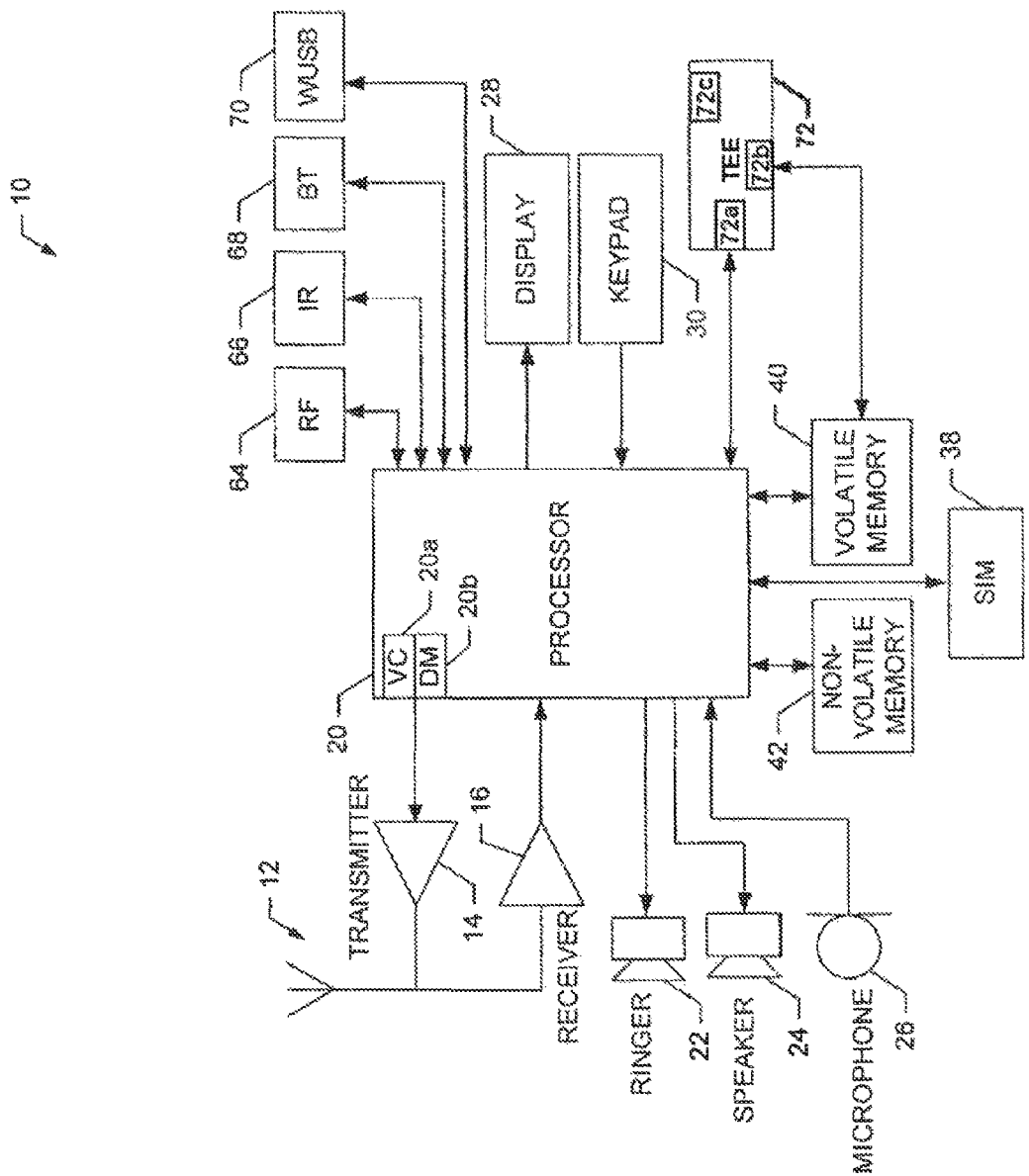
FIG. 2 illustrates a block diagram of an apparatus in accordance with an example embodiment of the invention.

FIG. 2 illustrates a block diagram of an apparatus 10 such as, for example, a mobile terminal, in accordance with an example embodiment of the invention. While several features of the apparatus are illustrated and will be hereinafter described for purposes of example, other types of electronic devices, such as mobile telephones, mobile computers, portable digital assistants (PDAs), pagers, laptop computers, desktop computers, gaming devices, televisions, routers, home gateways, and other types of electronic systems, may employ various embodiments of the invention.

As shown, the mobile terminal 10 may include at least one antenna 12 in communication with a transmitter 14 and a receiver 16. Alternatively transmit and receive antennas may be separate. The mobile terminal 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC), or field programmable gate array (FPGA), or some combination thereof. A processor comprising exactly one processing core may be referred to as a single-core processor, while a processor comprising more than one processing core may be referred to as a multi-core processor. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers (IEEE), 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem (IMS), communication protocols, for example, session initiation protocol (SIP), and/or the like. For example, the apparatus may be capable of operating in accordance with 2G wireless communication protocols IS-136, Time Division Multiple Access (TDMA), Global System for Mobile communications (GSM), IS-95, Code Division Multiple Access (CDMA), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the apparatus may be capable of operating in accordance with 3G wireless communication protocols such as Universal Mobile Telecommunications System (UMTS), Code Division Multiple Access 2000 (CDMA2000), WCDMA, Time Division-Synchronous Code Division Multiple Access (TD-SCDMA), and/or the like. The apparatus may be additionally capable of operating in accordance with 3.9G wireless communication protocols such as Long Term Evolution (LTE), or Evolved Universal Terrestrial Radio Access Network (E-UTRAN), and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System (NAMPS), as well as Total Access Communication System (TACS), mobile terminal apparatuses may also benefit from embodiments of this invention, as should dual or higher mode phone apparatuses, for example, digital/analogue or TDMA/CDMA/analogue phones. Additionally, apparatus 10 may be capable of operating according to Wi-Fi or Worldwide Interoperability for Microwave Access (Wi-MAX) protocols.

It is understood that the processor 20 may comprise circuitry for implementing audio/video and logic functions of apparatus 10. For example, the processor 20 may comprise a digital signal processor device, a microprocessor device, an analogue-to-digital converter, a digital-to-analogue converter, and/or the like. Control and signal processing functions of the mobile terminal may be allocated between these devices according to their respective capabilities. The processor may additionally comprise an internal voice coder (VC), 20a, an internal data modem (DM), 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the mobile terminal 10 to transmit and receive web content, such as location-based content, according to a protocol, such as wireless application protocol (WAP), hypertext transfer protocol (HTTP), and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus may comprise a battery for powering various circuits related to the mobile terminal, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 2, apparatus 10 may also include one or more means for sharing and/or obtaining data. For example, the apparatus may comprise a short-range radio frequency (RF), transceiver and/or interrogator 64 so data may be shared with and/or obtained from electronic devices in accordance with RF techniques. The apparatus may comprise other short-range transceivers, such as, for example, an infrared (IR), transceiver 66, a Bluetooth® (BT), transceiver 68 operating using Bluetooth® brand wireless technology developed by the Bluetooth® Special Interest Group, a wireless universal serial bus (USB), transceiver 70 and/or the like. The Bluetooth® transceiver 68 may be capable of operating according to low power or ultra-low power Bluetooth® technology, for example, Bluetooth low energy, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a SIM, 38, a removable user identity module (R-UIM), and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory (RAM), including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of a mobile terminal. For example, the memories may comprise an identifier, such as an international mobile equipment identification, IMEI, code, capable of uniquely identifying apparatus 10.

Apparatus 10 may further comprise a trusted execution environment TEE 72. TEE 72 may comprise, or be comprised in, a trusted execution apparatus, for example. TEE 72 may comprise memory access circuitry 72b arranged to be connectable to memory such as volatile memory 40 or non-volatile memory 42. Memory access circuitry 72b may be connectable to memory directly, as in FIG. 2, or indirectly for example via processor 20. TEE 72 may further comprise communication circuitry 72a arranged to be connectable to processor 20 or other entities. TEE 72 may further comprise execution circuitry 72c. In some embodiments, communication circuitry 72a comprises memory access circuitry 72b. In some embodiments, communication circuitry 72a performs the functions of memory access circuitry 72b and there is no separate memory access circuitry 72b. In some embodiments, TEE 72 is comprised in a radio chip.

Figure 3:
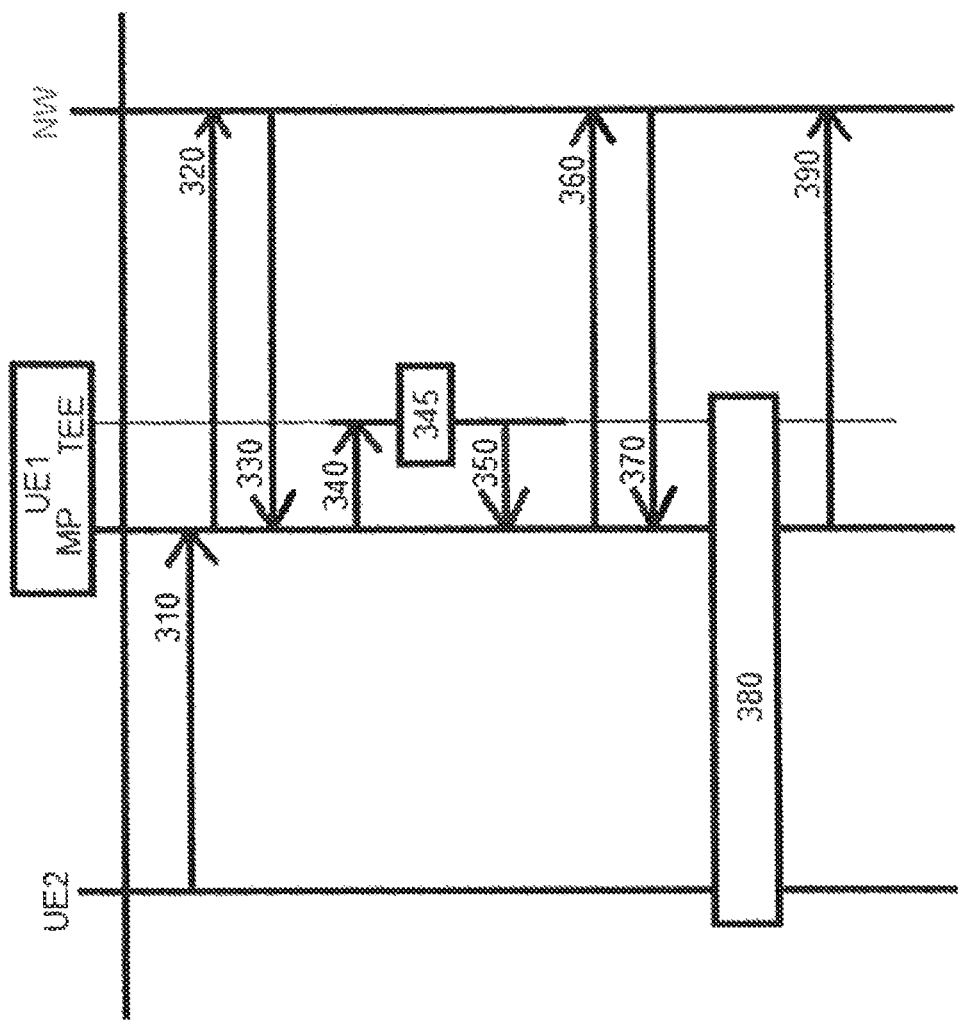
FIG. 3 illustrates signaling in accordance with an example embodiment of the invention.

FIG. 3 illustrates signaling in accordance with an example embodiment of the invention. On the vertical axes are, from left to right, user equipment UE2, a mobile user equipment UE1, which comprises a main processor MP and a trusted execution environment TEE, and finally a network NW. The network may correspond to an arrangement comprising at least one base station and a core network, for example. The physical form of signalling between TEE and MP may be implemented at a low level, such as, for example, by a separate physical wire connecting the TEE and MP to each other.

In phase 310, a D2D session request is transmitted from UE2 to UE1. Although illustrated as originating directly from UE1, in some embodiments the request may be routed via the network and received in UE1 from the NW. UE1 may responsively request permission from network NW to participate in the requested session, which is illustrated as arrow 320. The network may transmit a message 330 to UE1, the message comprising at least one of an instruction to intercept and a nonce. The message may be encrypted and/or digitally signed. Main processor MP of UE1 may, in phase 340, provide at least part of the message to trusted execution environment of UE1, TEE. In phase 345 the TEE may process the message, wherein the processing may comprise at least one of decrypting the message, verifying a digital signature of the message, determining whether the message comprises an instruction to intercept contents of the requested D2D session and computing a response to a nonce comprised in the message, in embodiments where the message comprised a nonce.

In phase 350 trusted execution environment TEE may reply to the main processor MP to authorize the requested D2D session. The authorization 350 may comprise a response to the nonce, and where the response to the nonce is present phases 360 and 370 are present. In phase 360 UE1 provides the response to the nonce to network NW, and in phase 370 network NW, having verified the response is correct, authorizes the requested D2D communication. Having verified the response to the nonce to be correct, network NW can have confidence that any instruction to intercept comprised in the message of phase 330 has been received in the trusted execution environment TEE of UE1.

After phase 370, being in possession of authorization to establish the requested D2D session, UE1 participates in D2D session establishment that results in D2D session 380 being formed. Contents of session 380 may be routed via trusted execution environment TEE regardless of whether the TEE performs interception of contents of the D2D session. In other embodiments, the main processor is instructed by the TEE to intercept contents of the D2D session without routing the contents via the TEE. Such embodiments are simpler to implement but may be less secure. In case interception was instructed in the message of phase 330, UE1 will provide at least part of contents of the D2D session to network NW, in phase 390. Phase 390 may occur at least in part simultaneously with D2D session 380. The providing of phase 390 may originate in the TEE or MP, for example, depending on the embodiment.

Figure 4:
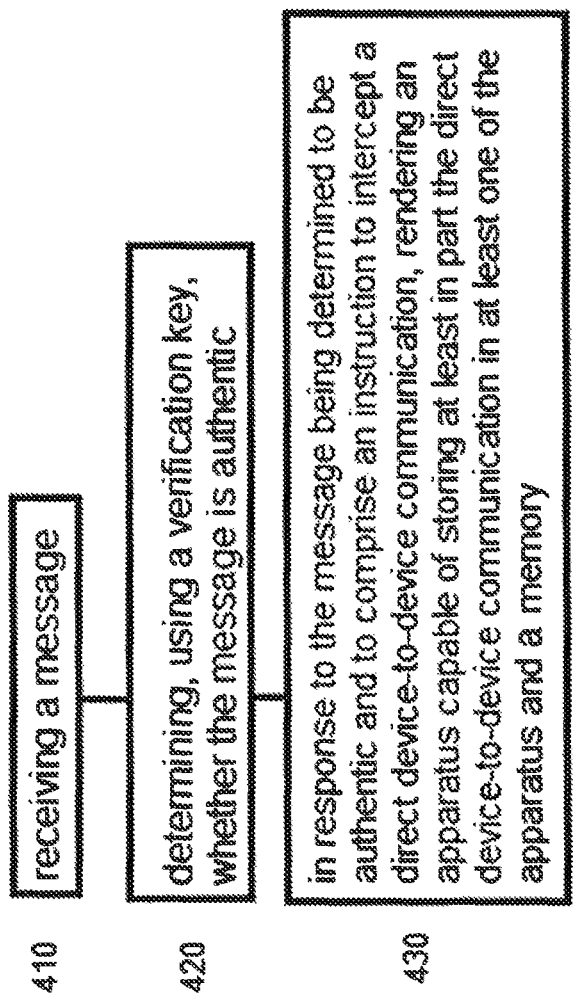
FIG. 4 is a flow diagram illustrating a method in accordance with at least some embodiments of the invention.

FIG. 4 is a flow diagram illustrating a method in accordance with at least some embodiments of the invention. The phases of the method may be performed in mobile 150, for example. In mobile 150, the phases of the method may be performed in trusted execution environment TEE, for example. Phase 410 comprises receiving a message. Optional phase 420 comprises determining, using a verification key, whether the message is authentic. In some embodiments, phase 420 is either absent or performed only conditionally. Phase 430 comprises rendering, in response to the message being determined to be authentic and to comprise an instruction to intercept a direct device-to-device communication, an apparatus capable of storing at least in part the direct device-to-device communication in at least one of the apparatus and a memory. In embodiments where phase 420 is absent, the rendering of phase 430 is performed responsive to the message being determined to comprise an instructions to intercept the direct device-to-device communication.

Without in any way limiting the scope, interpretation, or application of the claims appearing below, a technical effect of one or more of the example embodiments disclosed herein is that by intercepting in a mobile, quality of service may be maintained unchanged as routing of content need not be changed. Another technical effect of one or more of the example embodiments disclosed herein is that interception is enabled for D2D communicating mobiles that are not associated with a same base station. Another technical effect of one or more of the example embodiments disclosed herein is that interception is enabled for D2D communicating mobiles that are not associated with a same operator.

Embodiments of the present invention may be implemented in software, hardware, application logic or a combination of software, hardware and application logic. The software, application logic and/or hardware may reside on memory 40, the control apparatus 20, TEE 72 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
at least one processor; and
at least one memory including computer program code for one or more programs, the at least one memory and the computer program code configured to, with the at least one processor, cause the apparatus to at least:
  receive, from a network node and in response to a request to join a direct device-to-device communication with a second user equipment, an encrypted message;
  process the encrypted message to determine whether the encrypted message comprises an instruction to intercept at least a portion of the direct device-to-device communication;
  indicate, after the encrypted message is processed, that a first user equipment is authorized to join the direct device-to-device communication; and
  store, when the encrypted message comprises the instruction to intercept and after the first user equipment is indicated as authorized, at least a first portion of the direct device-to-device communication in the at least one memory.

2. An apparatus according to claim 1, wherein the apparatus is further caused to at least:
determine, using a verification key, whether the encrypted message is authentic; and
abstain, when the encrypted message is not determined to be authentic, from intercepting the direct device-to-device communication.

3. An apparatus according to claim 1, wherein:
the at least one processor comprises a main processor and a dedicated security processor within the first user equipment;
the encrypted message is processed by the dedicated security processor to determine whether the encrypted message comprises the instruction to intercept;
the dedicated security processor indicates to the main processor that first user equipment is authorized to join the direct device-to-device communication; and
the main processor controls the direct device-to-device communication with the second user equipment after the first user equipment is indicated as authorized.

4. An apparatus according claim 1, wherein the apparatus is further caused to at least:
encrypt, based on at least an encryption key contained in the encrypted message, the stored first portion of the direct device-to-device communication to generate an encrypted communication; and
provide, to the network node, the encrypted communication.

5. An apparatus according to claim 4, wherein the encrypted communication is provided to the network node before the direct device-to-device communication ends.

6. An apparatus according to claim 1, wherein the apparatus is further caused to at least:
retrieve a decryption key from the at least one memory; and
decrypt the encrypted message using the decryption key.

7. An apparatus according to claim 1, wherein the apparatus comprises and/or is comprised in a trusted execution environment.

8. An apparatus according to claim 7, wherein the trusted execution environment is configured to transmit a response to a nonce comprised in the encrypted message.

9. An apparatus according to claim 1, wherein the apparatus comprises and/or is comprised in a radio controller chip.

10. An apparatus according to claim 1, wherein the apparatus comprises and/or is comprised in a secure integrated card.

11. A method, comprising:
receiving, from a network node and in response to a request to join a direct device-to-device communication with a second user equipment, an encrypted message,
processing the encrypted message to determine whether the encrypted message comprises an instruction to intercept at least a portion of the direct device-to-device communication;
indicating, after the encrypted message is processed, that a first user equipment is authorized to join the direct device-to-device communication; and
storing, when the encrypted message comprises the instruction to intercept and after the first user equipment is indicated as authorized, at least a first portion of in part the direct device-to-device communication in at least one of the first user equipment or a memory.

12. A method according to claim 11, further comprising:
determining, using a verification key, whether the encrypted message is authentic; and
abstaining, when the encrypted message is not determined to be authentic, from intercepting the direct device-to-device communication.

13. A method according to claim 11, wherein
the first user equipment comprises a main processor and a dedicated security processor;
the processing is performed by the dedicated security processor;
the dedicated security processor indicates to the main processor that first user equipment is authorized to join the direct device-to-device communication; and
the main processor controls the direct device-to-device communication with the second user equipment after the first user equipment is indicated as authorized.

14. A method according to claim 11, further comprising:
encrypting, based on at least an encryption key contained in the encrypted message, the stored first portion of the direct device-to-device communication to generate an encrypted communication; and
providing, to the network node, the encrypted communication.

15. A method according to claim 14, wherein the first portion of the direct device-to-device communication is provided to toward the network node before the direct device-to-device communication ends.

16. A method according to claim 11, further comprising:
decrypting the encrypted message using a decryption key.

17. A method according to claim 11, comprising:
performing the receiving, the processing, the indicating, and the storing in at least one of a trusted execution environment, a radio controller chip, a secure integrated card, and the first user equipment.

18. A non-transitory computer readable-medium including instructions that when executed by at least one processor, result in operations comprising:
receiving, from a network node and in response to a request to join a direct device-to-device communication with a second user equipment, an encrypted message,
processing the encrypted message to determine whether the encrypted message comprises an instruction to intercept at least a portion of the direct device-to-device communication;
indicating, after the encrypted message is processed, that a first user equipment is authorized to join the direct device-to-device communication; and
storing, when the encrypted message comprises the instruction to intercept and after the first user equipment is indicated as authorized, at least a first portion of the direct device-to-device communication in at least one of the first user equipment or a memory.

19. A computer readable-medium according to claim 18, the operations further comprising:
determining, using a verification key, whether the encrypted message is authentic; and
abstaining, when the encrypted message is not determined to be authentic, from intercepting the direct device-to-device communication.

20. A computer readable-medium according to claim 18, the operations further comprising:
encrypting, based on at least an encryption key contained in the encrypted message, the stored first portion of the direct device-to-device communication to generate an encrypted communication; and
providing, to the network node, the encrypted communication.

* * * * *